US006564615B1

(12) United States Patent
Carter

(10) Patent No.: US 6,564,615 B1
(45) Date of Patent: May 20, 2003

(54) TESTING VAPOR RECOVERY SYSTEMS

(76) Inventor: Rodney Carter, 13 Hawthorne Ave., Sawston, Cambs (GB), CB2 4TE (*) Notice: Subject to any disclaimer, the term of this patent is extended or adjusted under 35 U.S.C. 154(b) by 0 days.

(21) Appl. No.: 09/913,983

(22) PCT Filed: Feb. 21, 2000

(86) PCT No.: PCT/GB00/00616

§ 371 (c)(1),
(2), (4) Date: Jan. 4, 2002

(87) PCT Pub. No.: WO00/50334

PCT Pub. Date: Aug. 31, 2000

(30) Foreign Application Priority Data

Feb. 22, 1999 (GB) ............................................ 9904030

(51) Int. Cl.[7] ............................ B67D 5/08; B67D 5/04; G01M 3/30

(52) U.S. Cl. ......................... 73/49.2 T; 73/40; 340/606

(58) Field of Search ............. 73/49.2, 40; 340/605–606

(56) References Cited

U.S. PATENT DOCUMENTS

| | | | | | |
|---|---|---|---|---|---|
| 1,417,892 | A | * | 5/1922 | Ehrentraut | 73/49.2 T |
| 3,537,298 | A | * | 11/1970 | Kapff | 73/49.2 T |
| 3,902,356 | A | * | 9/1975 | Rupf-Bolz | 73/49.2 T |
| 4,474,054 | A | * | 10/1984 | Ainlay | 73/49.2 T |
| 4,561,291 | A | * | 12/1985 | Ainlay | 73/49.2 T |
| 4,709,577 | A | * | 12/1987 | Thompson | 73/40.7 |
| 4,787,772 | A | * | 11/1988 | Wagner | 405/53 |
| 4,862,734 | A | * | 9/1989 | Elderton | 73/49.2 T |
| 4,885,931 | A | * | 12/1989 | Horner | 73/49.2 T |
| 4,893,498 | A | * | 1/1990 | Jensen | 73/49.2 T |
| 5,297,423 | A | | 3/1994 | Keating et al. | 73/49.2 |
| 5,363,093 | A | | 11/1994 | Williams et al. | 340/605 |
| 5,390,645 | A | | 2/1995 | Cook et al. | 123/520 |

FOREIGN PATENT DOCUMENTS

| | | |
|---|---|---|
| DE | 4224950 | 10/1993 |
| EP | 0751095 | 1/1997 |
| WO | WO97/43204 | 11/1997 |

* cited by examiner

*Primary Examiner*—Helen Kwok
*Assistant Examiner*—David J. Wiggins
(74) *Attorney, Agent, or Firm*—Andrus, Sceales, Starke & Sawall, LLP

(57) ABSTRACT

A method of leakage testing a volatile liquid tank farm together with a vapour recovery system, to collect vapour from the tanks at the time of re-filling them with volatile liquid. The tank farm has individual fill-pipes (13) for each tank (10) with each fill-pipe outlet below the normal minimum liquid level in the tank and each tank having a vent-pipe (11) connected to a common manifold (25). To perform the test, the common manifold is closed to atmosphere and one side of a shut-off valve (17) is connected to the manifold (25), a flow meter (20) being connected to the other side of the shut-off valve. Flow meters (22, 23) are coupled to all but one of the fill-pipes (13), the shut-off valve (17) is opened to allow volatile liquid to be supplied to the remaining fill-pipe so as to increase the volume of volatile liquid in the associated tank, and the out-flow of gas or wet vapour from the common manifold (25) is monitored via the flowmeters (20, 22, 23) for substantial correlation to the volume of volatile liquid admitted into the tank associated with the remaining fill-pipe. The method can be modified also to allow the testing of individual tanks of a tank farm, where the vent pipes of the tanks individually vent to atmosphere, with the leakage test or vapour recovery system test then being performed one at time, on each of the individual tank(s).

18 Claims, 4 Drawing Sheets

FIG. 3
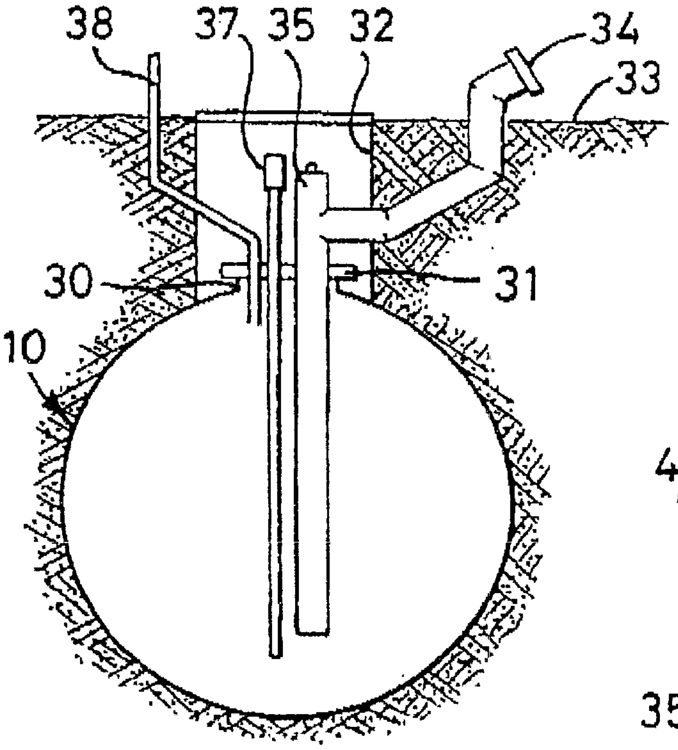
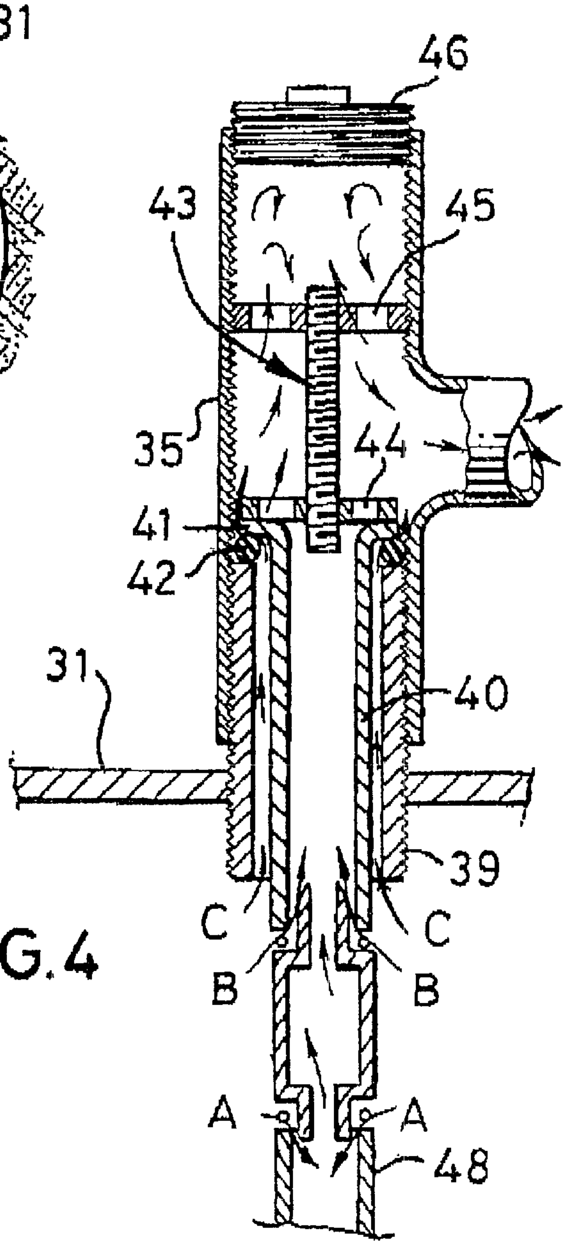
FIG. 4

TESTING VAPOR RECOVERY SYSTEMS

CROSS-REFERENCE TO RELATED APPLICATIONS

This application is the U.S. national stage application of International Application PCT/GB00/00616, filed Feb. 21, 2000, which international application was published on Aug. 31, 2000 as International Publication WO00/50334 in the English language. The International Application claims priority of Great Britain Patent Application 9904030.5, filed Feb. 22, 1999.

BACKGROUND OF THE INVENTION

This invention relates to a method of testing a vapour recovery system associated with a tank for a volatile liquid, such as a tank for holding petroleum spirit (hereinafter referred to simply as "spirit") as installed at a fuel filling station for motor vehicles. The invention further relates to a method of testing a vapour recovery system of a tank farm, comprising a plurality of such spirit tanks, and a method of testing a tank installation.

Historically, a spirit tank at a fuel filling station had a simple vent-pipe, leading to atmosphere. This allowed vapour displaced from the tank during a refilling operation to be vented to atmosphere. Between deliveries, the vent-pipe allowed natural venting of the tank to take place as well as the ingress of air upon spirit being withdrawn from the tank, to be dispensed through a fuel delivery pump.

To overcome the problem of environmental pollution consequent upon this natural venting process, spirit tank farms have been, and are being, modified in various ways to operate on a current standard known as Stage 1B, where vapour displaced from a tank during a delivery process is returned to a road tanker delivering the spirit. A typical modification is to connect all of the individual spirit tank vent-pipes to a common manifold which has a single vent-pipe fitted with a pressure/vacuum valve (referred to hereinafter as a "p/v valve"), or sometimes a plurality of vent-pipes each fitted with a p/v valve. A p/v valve is normally closed but opens if the pressure in the manifold to which it is connected falls below a pre-set sub-atmospheric value, caused by dispensing spirit, or if the pressure rises above some other pre-set value above atmospheric.

When spirit is to be loaded into one or more of the tanks, the common manifold is connected to a vapour recovery system on the delivery road tanker, and the spirit vapour is drawn back into the tanker to be processed back to liquid spirit. In this way, much of the vapour previously released to atmosphere can be prevented, at the time of refilling the tanks of a filling station.

In the United Kingdom, at the present time it is a legal requirement to have all vapour recovery systems at retail petrol filling stations registered with the appropriate authority. Shortly it will be a requirement that such a system is tested to ensure that the system operates correctly, efficiently and safely with any leaks falling within the low limits set within European guidelines.

BRIEF SUMMARY OF THE INVENTION

The present invention aims at providing a method of testing one or more tanks intended to hold spirit, firstly to ensure that the installation is suitable for the fitting of a vapour recovery system and secondly, once such a vapour recovery system has been installed, that the system is operating correctly, efficiently and safely, with no significant leaks that would prevent the recover system from operating correctly, efficiently and safely.

According to a first aspect of the present invention, there is provided a method of testing a volatile liquid tank installation having a fill-pipe projecting downwardly into the tank with the fill-pipe outlet below the normal minimum liquid level in the tank and the tank also having a vent-pipe, in which method one side of a shut-off valve is connected to the vent-pipe, a flow meter is connected to the other side of the shut-off valve, said valve is opened, liquid is supplied to the tank so as to increase the volume of liquid therein, and the out-flow of gas or wet vapour from the vent-pipe is monitored for substantial correlation to the volume of liquid admitted to the tank.

It will be appreciated that this method permits the testing of individual spirit and/or diesel tanks as installed for example at a fuel filling station, where those tanks are naturally vented as has been described above, prior to the fitting of a vapour recovery system such as that known in the UK as a Stage 1B system. By monitoring the volume out-flow of vapour from the vent-pipe for a substantial correlation with the volume in-flow into the tank, and preferably also the vapour flow rate and time of out-flow, for comparison with the time and in-flow of liquid fuel, there can be a reasonable assurance that there is no significant leak, permitting the escape to atmosphere of the vapour, from some other point in the installation. If the correlation falls outside expected limits, a leak, blockage or restriction may be suspected and a suitable investigation commenced.

Advantageously, a pressure gauge is arranged to sense the pressure in the vent-pipe, liquid is supplied to the fill-pipe so as to increase the volume of liquid in the tank, and the shut-off valve is operated to control the build-up of pressure in the vent-pipe up to some maximum value, consequent upon the displacement of vapour or wet vapour from the tank. At the completion of the delivery of liquid to the tank, the shut-off valve is closed and the subsequent decay of the pressure in the vent-pipe is monitored. By monitoring this decay, it is possible to determine whether there are leaks; and by taking into account the various relevant parameters (such as tank volume, ullage space, starting pressure and so on), then the seriousness of a suspected leak may be assessed.

Preferably, the testing is performed in the above order—that is to say, the out-flow of vapour on supplying liquid to a tank is checked prior to testing for the decay in pressure allowed to build in the vent-pipe, when the valve is closed.

Even prior to performing the test described above, a preliminary step may be performed, in which the shut-off valve is closed and the pressure within the vent-pipe is monitored as liquid is drawn from the tank. Such drawing of liquid may be in the course of the filling of the tanks of motor vehicles and should create a negative pressure in the vent-pipe; this part of the test will also serve to ensure that there are no, or only minimal leaks.

Once, the individual tanks have been tested and found to comply within the permitted pre-set limits, the Stage 1B vapour recovery system may be installed. Then, that implementation may be tested for compliance and it is recommended that the installation is tested periodically for continuing compliance, typically once every twelve months.

According to a second aspect of this invention, therefore, there is provided a method of testing a vapour recovery system installed at a volatile liquid tank farm comprising a plurality of volatile liquid tanks each having an individual fill-pipe projecting downwardly into the tank with the fill-pipe outlet below the normal minimum liquid level in the tank and each tank having a vent-pipe coupled to a common manifold, in which method the common manifold is closed to atmosphere and one side of a shut-off valve is connected to the manifold, a flow meter is connected to the other side of the shut-off valve, flow meters are coupled to all but one of the fill-pipes, said shut-off valve is opened, liquid is supplied to the remaining fill-pipe so as to increase the volume of liquid in the associated tank, and the out-flow of gas of wet vapour from the common manifold is monitored for substantial correlation to the volume of liquid admitted to the tank associated with said remaining fill-pipe.

Preferably, a pressure gauge is arranged to sense the pressure in the manifold, liquid is supplied to said remaining fill-pipe so as to increase the volume of liquid in the associated tank, the shut-off valve is operated to control the build-up of pressure in the manifold consequent upon the displacement of gas or wet vapour from the tank, the shut-off valve is closed upon the completion of the supply of liquid to the tank, and the subsequent decay of the pressure in the manifold is monitored. In the alternative, the shut-off valve need not be closed until all tanks have been supplied with liquid, the decay then being measured for the whole system, at the very end of the testing procedure.

In a Stage 1B vapour recovery system, the common, manifold is fitted with one or more p/v valves. For such a case, the vacuum operation of the p/v valve should be tested before the performance of the testing method, by having the shut-off valve closed and checking for a negative pressure in the manifold. The pressure side of the p/v valve may be checked later, again with the shut-off valve closed, and allowing pressure to build until the p/v valve opens—which normally should be at 35 mbar, for the systems currently in use.

With a Stage 1B system, vapour displaced from a spirit tank by incoming fuel into that tank is recovered by being drawn back to the delivery tanker from the manifold, and this relies on the tanker generating a sub-atmospheric pressure to draw the vapour. For this purpose, a hose is arranged to connect the other side of the shut-off valve to a vapour recovery system (such as on a tanker), and a pressure gauge is arranged to sense pressure in that hose, to test for a sub-atmospheric pressure generated by the vapour recovery system, such as on the tanker.

For a multi-tank farm, the testing method should be repeated for each tank of the Farm, with liquid being supplied to the different tanks during each performance of the testing method. Repeated performance of the testing method may be effected by transferring a flow meter from one fill-pipe to another and then supplying the liquid to the pipe from which the flow meter was removed, and monitoring for out-flow of gas or wet vapour from the other fill-pipes.

BRIEF DESCRIPTION OF THE SEVERAL VIEWS OF THE DRAWING

In order that the invention may better be understood, two specific examples of testing method of this invention will now be described in detail, reference being made to the accompanying drawings, in which:

FIG. 3 is a diagrammatic cross-section through an underground tank of a tank farm;

FIG. 4 is a diagrammatic vertical section through a filling assembly for a tank, showing possible leaks.

DETAILED DESCRIPTION OF THE INVENTION

Figure 1:
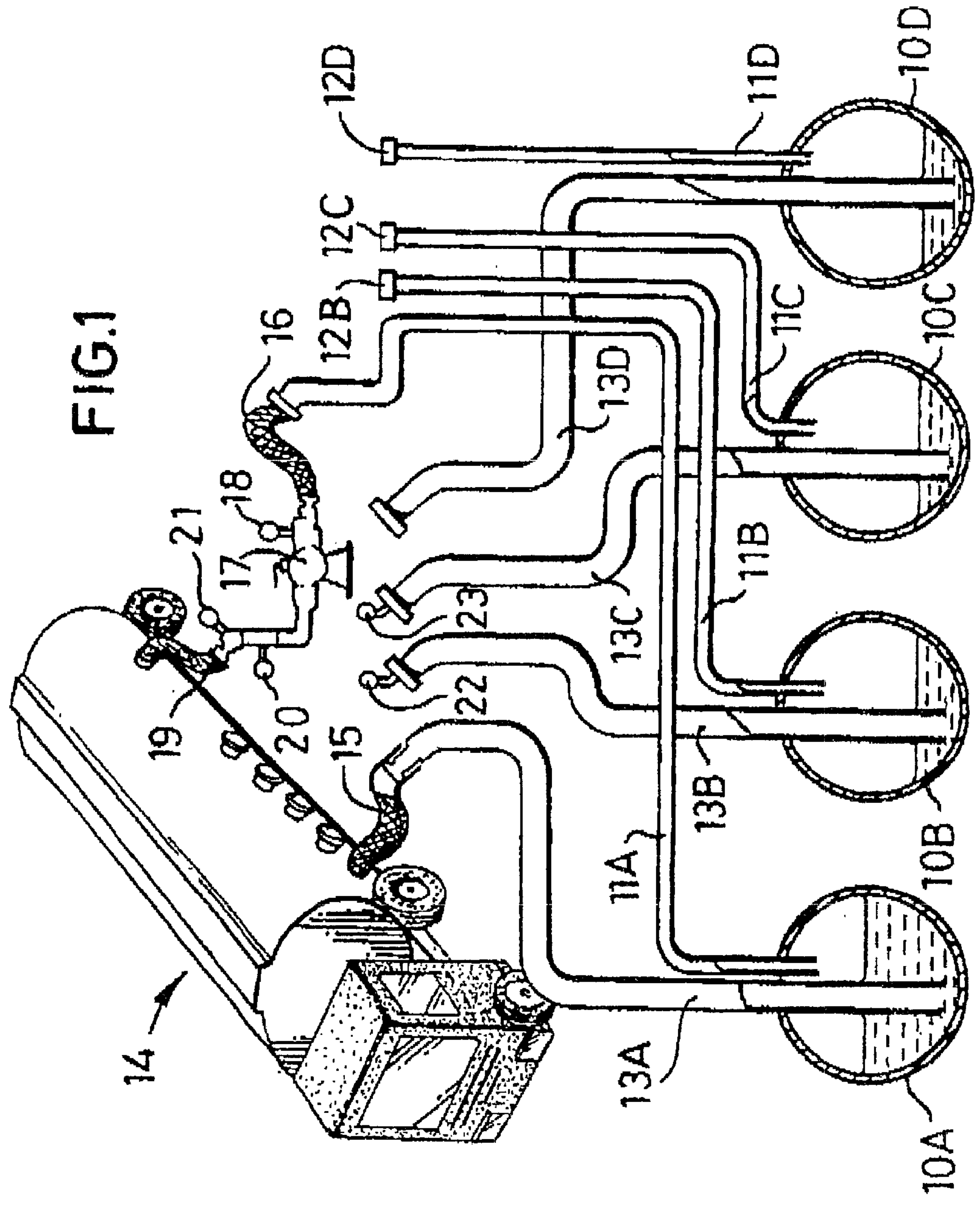
FIG. 1 diagrammatically represents a tank farm having naturally vented tanks, in the course of being tested.

Referring initially to FIG. 1, there is shown a tank farm having a plurality of underground spirit tanks 10A, 10D, 10C and 10D, each having its own individual vent-pipe 11A, 11B, 11C and 11D. Each vent-pipe leads from an upper portion of the respective tank and has a simple weather cap 12 feted to the free upper end of the pipe. Each tank 10A . . . 10D has a respective relatively large diameter fill-pipe 13A . . . 13D, which fill-pipe leads to a lower portion of the respective tank. All of the upper ends of the fill-pipes are usually arranged in a close group (as shown), for easy access by a road tanker such as that illustrated at 14, delivering fuel to the tank farm.

The tanker 14 is fitted with a vapour recovery mechanism, whereby vapour driven from the ullage space of a tank during the filling of that tank may be drawn back into the tanker, to be processed to liquid fuel and re-used. For a naturally vented system as illustrated in FIG. 1, the delivery tanker's vapour recovery mechanism is not normally used. The delivery tanker "breathes" by its own p/v valves fitted to the top of each delivery compartment (pot). The storage tank, on receiving incoming fuel vents to atmosphere vapour driven from the tank through the vent-pipe. Fuel delivery is performed by connecting a flexible hose 15 from a pot of the tanker to a fill-pipe, and then opening the associated delivery valves on the tanker.

in the arrangement shown in FIG. 1, tank 10D is intended to hold diesel fuel. A flexible hose 16 is connected to the spirit tank vent-pipe 11A, after removing the weather cap 12 therefrom, that flexible hose 16 connecting to one side of a shut-off valve 17, mounted on a stand. The vent-pipe side of that valve is provided with a pressure/vacuum gauge 18, to sense the pressure prevailing in the associated vent-pipe.

The other side of the shut-off valve 17 is connected by a further hose 19 to the vapour recovery mechanism of the tanker 14, through a volume flow meter 20 and a further pressure/vacuum gauge 21. During off-loading of diesel fuel into tank 10D, the vacuum (negative pressure) created by the delivery tanker can be monitored on gauge 21. Then, at the start of a spirit drop into tank 10A, the fill-pipe for the diesel tank 10D is sealed, and the fuel pipes 13B and 13C of the other two spirit tanks are fitted with respective flow meters 22 and 23.

The installation of the flexible hose 16 and shut-off valve 17 may be completed prior to the arrival of the tanker 14, on site. The shut-off valve 17 must be in the closed position before connection to the tanker through hose 19, during which time the pressure/vacuum gauge 18 may be used to monitor the pressure fall in vent-pipe 11A as fuel is drawn from tank 10A, on filling motor vehicles attending the filling station. This pressure/vacuum gauge 18 will show that the pressure in the vent-pipe is falling, and remains low, as more and more fuel is drawn from the tank.

When the tanker arrives on site, it is connected to fill-pipe 13A by flexible hose 15 and to the shut-off valve 17 by flexible pipe 19, as described above. The valve 17 is opened and the vapour recovery system of the tanker operated; the pressure/vacuum gauge 21 will show whether the tanker's vapour recovery system is producing a suitable sub-atmospheric pressure for vapour recovery. Upon commencement of the dumping of fuel into tank 10A, a corresponding out-flow of vapour, or wet vapour, may be checked by the flow meter 20. Moreover, the flow meters 22 and 23 may also be checked, to ensure there is neither in-flow nor out-flow whilst tank 10A is being filled. Apart from possible pipe-work errors, this will also check for correct labelling of the vent-pipes.

Finally, the valve 17 is partially dosed and then operated as appropriate to prevent an excessive build-up of pressure in the vent-pipe as the dumping of spirit into the tank 10A continues, using gauge 18 to check the pressure. At the completion of the delivery, the valve 17 is closed and then the decay of pressure in tie vent-pipe is monitored, on gauge 18. If the pressure does not decay in the expected way (i.e. a small initial pressure drop whereafter the pressure stabilises), the presence of leaks must be presumed.

The above procedure is repeated for all three tanks and provided the obtained results ate within acceptable (but very low) limits, then a Stage 1B vapour recovery system may be installed. This is shown in FIG. 2, during the course of testing, and like parts of those of FIG. 1 are given like reference characters and will not be described in detail again, here.

Figure 2:
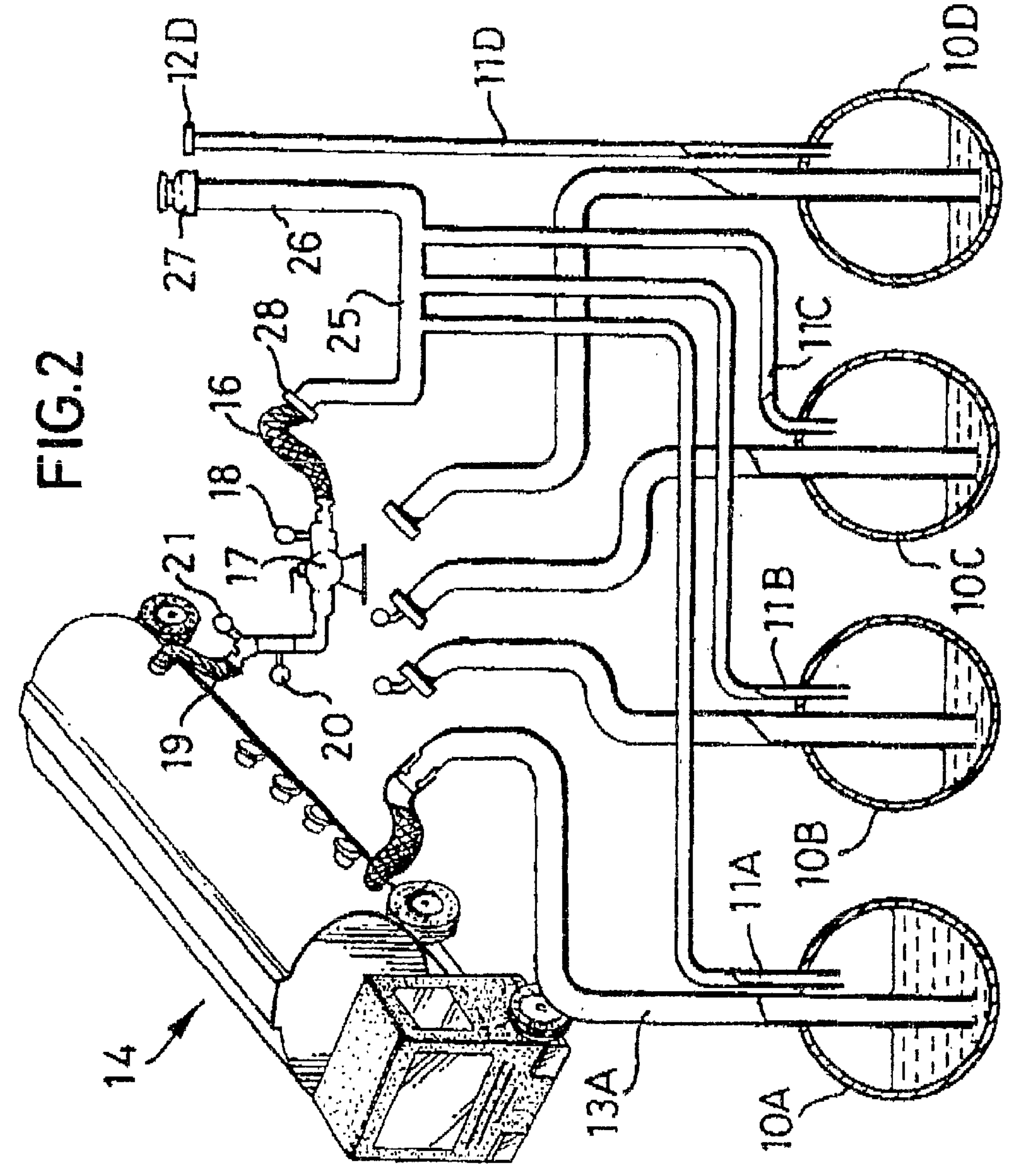
FIG. 2 is similar to FIG. 1, but of a tank farm fitted with a Stage 1B vapour recovery system.

As can be seen in FIG. 2, the three vent-pipes 11A, 11B and 11C are connected to a common manifold 25, having a single atmospheric vent-pipe 26 fitted with a p/v valve 27, which valve is arranged to open, and so vent the manifold to atmosphere, should the pressure within the manifold fall below or exceed a pre-set limit. So long as the pressure in the vent-pipe remains inside those limits, the p/v valve will remain closed. The manifold 25 moreover has a common connection 28 for the vapour recovery system of the tanker 14.

Below, the precise steps to be followed in a specific example of Stage 1B vapour recovery are set out. Here, the system is described in more general and broad terms.

To perform a method of this invention, the shut-off valve 17 on its stand is coupled to connection 28 by flexible hose 16, and also to the tanker by hose 19, as described above. The shut-off valve 17 is opened and the vapour recovery system of the tanker operated as fuel is dumped in the tank 10A; the flow of vapour through pipe 19 may be monitored on meter 20, and should fall within a range broadly comparable to the volume delivery of fuel into tank 10A. Moreover proper operation of the vapour recovery system on the tanker may be monitored by pressure gauge 21. The valve 17 may be closed temporarily at the start of a fuel dumping, to check there is a fall in pressure at gauge 21, so confirming the tanker's vapour recovery system is working.

The valve 17 is then closed as fuel continues to be dumped into tank 10A. Relatively short periods of fuel flow are dumped from different compartments (pots) of the tanker, one at a time, into each tank in sequence to allow the reaction time of vapour flow rates and the actual flow rates to be registered on gauge 20. By supplying fuel in sequence and for only a short period to each tank, the corruption of data is avoided and which otherwise could happen if each tank received its full load in one drop, for the tank farm would then become progressively charged with excessive vapour pressures, making the readings more and more inaccurate.

When the remainder of the fuel in the pot of the tanker is dumped into the first tank 10A, the ullage space of that tank will gradually be distributed across the ullage spaces of the other tanks and so a much lower rise in pressure may be anticipated. Further, a more rapid raise in pressure can be anticipated when loading fuel into the other tanks, again depending upon the volumes already in the tanks. The valve 17 is operated as appropriate to prevent an excessive build-up of pressure in the manifold as the dumping of fuel into the tank 10A continues, using gauge 18 to check the pressure. At the completion of the entire delivery to all the spirit tanks, the valve 17 is closed and then the decay of pressure in the manifold 25 is monitored, on gauge 18. If there is an excessive pressure decay (say more than 6 mbar over a 6 minute period), the presence of leaks can be presumed. Moreover, if there is an out-flow of vapour from either fill-pipe 13B or 13C, as determined by flow meter 22 or 23, it may be presumed that there is leakage at the connection between the fill-pipe and tie tank itself.

FIG. 3 illustrates a portion of an underground spirit tank including a manhole and lid, through which the fill-pipe passes As can be seen, the tank has a neck 30 fitted with a lid 31, the lid being disposed in a manhole 32 below the ground surface 33. The fill-pipe has a connection flange 34 at its free end above the ground, the pipe then passing through a side wall of the manhole and being connected to a T-piece 35 fitted to the tank lid. Below the lid, the fill-pipe extends down towards the bottom of the tank. Also shown in FIG. 3 is a gauge probe 37 and a vent-pipe 38.

Figure 5:
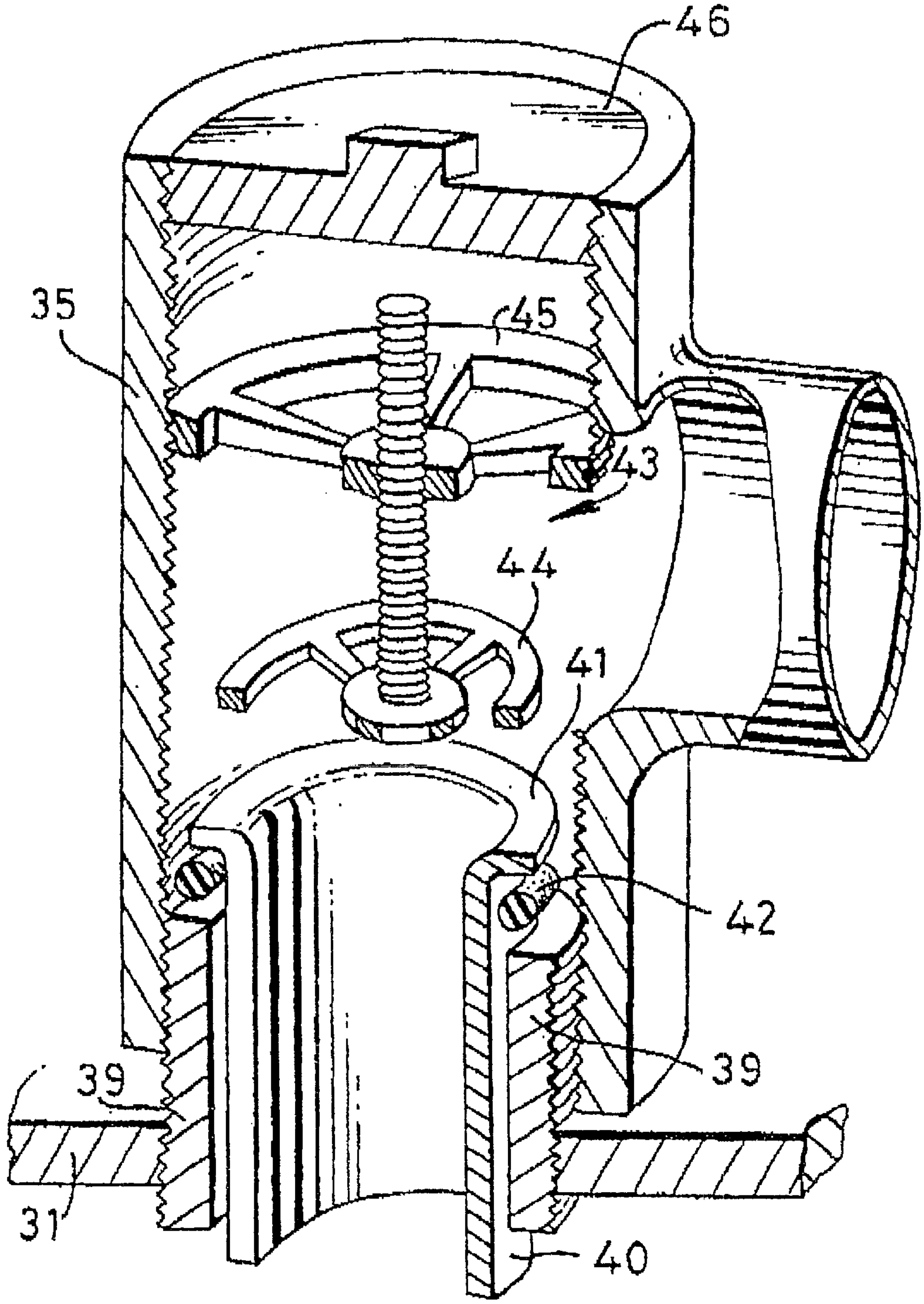
FIG. 5 is a cut-away view on an enlarged scale of a tank T-piece together with a fill-pipe.

FIGS. 4 and 5 show in more detail the construction at the tank lid 31. A tank lid nipple 39 is threaded into a threaded opening in the tank lid 31, and T-piece 35 is threaded on to that nipple. A flanged drop tube 40 passes through the nipple 39, a seal being effected between the flange 41 of the drop tube 40 and the nipple 39 by means of an O-ring 42. The drop tube is held down on to the O-ring by means of a drop tube retaining cage 43 having a lower pressure member 44 bearing on the flange 41 of the drop tube and a threaded ring 45 engaged with the threads in the upper part of the T-piece. By rotating ring 45, the pressure on the drop tube seal may be increased, to the required level.

The upper part of the T-piece is closed by a plug 46. The lower end of the drop tube 40 is connected to an overfill prevention valve 47, the lower end of which is connected to the lower portion of the fill-pipe 48, descending to the bottom of the tank.

As shown in FIG. 4, liquid or vapour leakage may occur at several of the joints described above and as illustrated by arrows A (the lower portion of the fill-pipe/overfill prevention valve connection 48/47), B (the overfill prevention valve/drop tube connection 47/40) and C (the drop tube/nipple connection 40/39). Moreover, leakage can occur at the tank lid/nipple connection 31/39, or the plug/T-piece connection 46/35.

It will be appreciated that the testing procedures described above allow proper and complete testing of a tank farm, initially when operating as a simple naturally vented system, and subsequently when a Stage 1B vapour recovery system has teen installed.

The full procedure to be followed in performing a complete Stage 1B vapour recovery system testing method will now be described in detail, referring to FIGS. 1 and 2.

1. Set up test equipment as shown in FIG. 2. Valve 17 is shut. Hose 16 is connected to site vapour recovery connection 28.
2. Delivery tanker arrives on site. Hose 19 is connected, one end to the tanker and the other end to valve 17.
3. The vacuum side of the p/v valve 27 is checked for correct operation with valve 17 shut; any negative pressure in the tank farm will register on gauge 18. A negative pressure will be caused by sales of petrol at the pumps and will indicate that the vacuum side of the p/v valve 27 is operating correctly.

4. Deliver hose 15 is connected to the diesel tank 10D at the fill point at the top of the fill-pipe 13D. Valve 17 is shut and as diesel is dumped into tank 10D, a negative pressure should be created within the tankers hose 19 and registers on gauge 21. This should be registering around −20 mbar if the tanker's vapour recovery equipment is operating correctly.
5. Dumping of the whole tanker compartment (pot) of diesel to be dumped is timed. This is the Total Pot Delivery Time (TPDT), in minutes and seconds.
6. Valve 17 is opened during the delivery of diesel to check again the correct operation of the vacuum side of the p/v valve 27.
7. The TPDT measured for this diesel pot is a convenient benchmark against which to measure the TPDT of all the other pots, diesel will normally off-load at a slower rate than spirit.
8. After diesel has finished, hose 15 is connected to tank 10A at the fill point at the top of fill-pipe 13A, and with valve 17 open, spirit is released from the tanker into tank 10A. This will promote vapour to flow through vent 11A and the Reaction Time (RT) is measured from when fuel is released from the tanker until vapour flow reaches gauge 20. This measured amount of time (usually in seconds) will be known as the initial Reaction Time (IRT). The maximum vapour flow rate (MFR) on gauge 20 and also the Time to reach Maximum Flow Rate (TRMFR) are assessed. The delivery of fuel into tank 10A is halted after 1 minute. This is the first stage drop completed for tank 10A.
9. The hose 15 is transferred to the fill point of tank 10B at the top of the fill-pipe 13B and to the correct fuel pot faucet on the tanker. The process is then repeated with fuel being dumped from another pot on the tanker into tank 10B. The IRT, MFR and TRMFR are then measured for this pot and fuel delivery halted after 1 minute The period of 1 minute is normally more than sufficient time to obtain all relevant readings, but should continue as long as necessary to get all the readings and make a note of the time taken.
10. The hose 15 is then transferred to the fill point of tank 10C at the top of the fill-pipe 13C and the process repeated again, with fuel being dumped from another pot on the delivery tanker.
11. With regard to a site configuration as in FIG. 1, the following readings are obtained:

TPDT for the diesel tank 10D in minutes and seconds.

IRT for the spirit tanks 10A, 10B, 10C in seconds.

MFR for the same 3 tanks, in litres of vapour flow per minute.

TRMFR for the same 3 tanks, in seconds.

The tine of the first stage drop for each spirit tank (normally 1 minute).
12. Analysing the above times and flow rates for the different tanks and comparing them with one another, will highlight the characteristics that are likely to cause faults within the site's vapour recovery system. For example, if all the tanks are positioned very close together on the forecourt, we might expect all the readings to be similar. If however one tank has a very slow IRT and TRMFR and a very low MFR as compared to the others, this is likely to indicate some form of blockage or restriction in the vent-pipe 11 of that tank.
13. The hose 15 is then reconnected to the fill point on tank 10A and the correct pot faucet on the tanker, for the second stage of the drop. Dumping of the remainder of fuel in that pot is timed and added to the time of the first stage (normally 1 minute), to give the TPDT for each tank. To calculate the delivery rate for each pot, the volume of fuel off-loaded in each pot is divided by TPDT. This figure (in litres/minute) should relate closely to the maximum vapour flow rate registered on gauge 20.
14. During the dumping of fuel from each pot, the valve 17 is briefly shut to check that either a negative pressure or a pressure drop on gauge 21 is registered. This will indicate that the p/v valve located on top of that pot on the delivery tanker is operating correctly.
15. During the second stage of off-loading fuel into each of the spirit tanks 10A, 10B, 10C, it is necessary to use two or more hoses simultaneously, connected to the respective tanker pot and tank, to measure the combined vapour flow rate through the manifold 25. This will register on gauge 20. This reading (litres/minute) enables the analysis of the characteristics of any blockage or restriction in the manifold.
16. Once this "Dual Flow Rate" has been measured, valve 17 is partially closed whilst fuel is still off-loading into the tanks. This allows the build-up and maintenance of a steady pressure within the site's Stage 1B vapour recovery system.
17. While this pressure is building up and being monitored on gauge 18, flow rate gauges 22 and 23, are fitted on to the fill point connection at the top of fill-pipes 13B and 13C (not shown on FIG. 2). These gauges are shut before being fitted.
18. When the pressure in the vapour recovery system has reached and is maintained at just below the release pressure of the p/v valve 27 (normally 35 mbar), the flow rate gauges 22 and 23 are opened and the indicator needle allowed to settle. Any leaks from the fill-pipes 13B and 13C will register as a continuous and steady flow rate on these gauges. This process is repeated on all the fill points of all the spirit tanks as the hose 15 is swapped around from tank to tank.
19. While the second stage drop of the very last pot is being off-loaded, valve 17 is shut fully to build up pressure in the system in order to check the release pressure of the p/v valve 27. The build up of pressure is monitored on gauge 18 and at or around 35 mbar, the p/v valve should activate and open, temporarily releasing the pressure and vapour to atmosphere. If the p/v valve is operating correctly, the needle on gauge 18 will rapidly fluctuate up and down, as the p/v valve opens and loses in surges. (It can easily be heard opening and closing rapidly and it should be easy to see vapour escaping from it). If it is not operating correctly, the needle on gauge 18 will continue to rise well beyond 35 mbar, indicating that the valve has stuck down shut. The whole valve will need to be replaced if either its pressure or vacuum sides are not operating correctly. The valve will also be deemed faulty if it opens prematurely at below 35 mbar.
20. Once this has been checked, valve 17 is partially opened to maintain a steady pressure in the system just below the release pressure of the p/v valve 27. To maintain a constant pressure will require continuous attention to gauge 18 and minor adjustment of the valve 17 until the very last pot of fuel has been completed. The valve 17 is then shut immediately, locking in this pressure within the Stage 1B vapour recovery system.
21. This pressure reading of just under 35 mbar on gauge 18 will decay slightly for a short period of time as the fuel in the tank settles. The pressure should then remain stable at around 30 mbar. Any significant decay in pressure (over a 10 mbar drop) over the next 6 minutes will indicate the presence of leaks within the system.

22. With valve 17 shut, the tanker driver has completed the off-loading and disconnects the delivery hose 15 end vapour recovery hose 19 and can leave the site.

23. Hose 16 is then disconnected from vapour recovery connection valve 28 that should then automatically shut tight. Another flow meter gauge (similar to 22 and 23) is fitted to a cap connected to valve 28. Before being fitted, the gauge is shut. After a short period, the flow rate gauge is opened and the indicator needle allowed to settle. Any continuous flow registering on this gauge will indicate that the vapour recovery connection valve 28 is faulty and will need to be replaced.

24. The Stage 1B vapour recovery test is now complete. All that remains is to analyse the test results and prepare the report.

What is claimed is:

1. A method of leakage testing a volatile liquid tank installation having a fill-pipe projecting downwardly into the tank with the fill-pipe outlet below the normal minimum liquid level in the tank and the tank also having a vent-pipe, in which method one side of a shut-off valve is connected to the vent-pipe, a flow meter is connected to the other side of the shut-off valve, said method involving the step of as said valve is opened, volatile liquid is supplied to the tank so as to increase the volume of volatile liquid therein, and the out-flow of gas or wet vapour from the vent-pipe is monitored via said flow meter for substantial correlation to the volume of volatile liquid admitted to the tank.

2. A method of testing as claimed in claim 1, in which the reaction time of the out-flow of gas or wet vapour to register on a gauge associated with said shut-off valve is also monitored.

3. A method of testing as claimed in claim 2, in which said reaction time is monitored from the commencement of liquid supply to the tank.

4. A method of testing as claimed in claim 1, in which a pressure gauge is arranged to sense the pressure in the vent-pipe, liquid is supplied to the fill-pipe so as to increase the volume of liquid in the tank, the shut-off valve is operated to control the build-up of pressure in the vent-pipe consequent upon the displacement of vapour or wet vapour from the tank.

5. A method as claimed in claim 4, in which the shut-off valve is closed upon the completion of the supply of liquid to the tank, and the subsequent decay of the pressure in the vent-pipe is monitored.

6. A method of testing as claimed in claim 1, in which the shut-off valve is closed and pressure within the vent-pipe is monitored as liquid is drawn from the tank, as a first step of the testing method.

7. A method as claimed in claim 6, in which the vent-pipe is fitted with at least one pressure/vacuum valve (p/v valve) arranged to limit the maximum and minimum pressures in the vent-pipe.

8. A method of leakage testing a volatile liquid tank farm comprising a plurality of tanks each having an individual fill-pipe projecting downwardly into the tank with the fill-pipe outlet below the normal minimum liquid level in the tank and each tank having a vent-pipe coupled to a common manifold, in which method the common manifold is closed to atmosphere and one side of a shut-off valve is connected to the manifold, a flow meter is connected to the other side of the shut-off valve, a plurality of flow meters are coupled to all but one of the fill-pipes, said method involving the step of as said shut-off valve is opened, a volatile liquid is supplied to the remaining fill-pipe so as to increase the volume of volatile liquid in the associated tank, and the out-flow of gas or wet vapour from the common manifold is monitored via said flow meter for substantial correlation to the volume of volatile liquid admitted to the tank associated with said remaining fill-pipe.

9. A method as claimed in claim 8, in which liquid is supplied simultaneously to two tanks for a part of the overall testing method, the combined out-flow of gas or wet vapour being monitored during this time.

10. A method as claimed in claim 8, in which the shut-off valve is closed during the start of the supply of liquid to a tank, and the pressure in the common manifold is monitored to test for leaks at the fill-pipes of the other tanks.

11. A method as claimed in claim 5, in which a pressure gauge is arranged to sense the pressure in the manifold, liquid is supplied to said remaining fill-pipe so as to increase the volume of liquid in the associated tank, the shut-off valve is operated to control the build-up of pressure in the manifold consequent upon the displacement of gas or wet vapour from the tank.

12. A method as claimed in claim 11, in which the shut-off valve is closed upon the completion of the supply of liquid to all of the tanks, and the subsequent decay of the pressure in the manifold is monitored.

13. A method as claimed in claim 8, in which the flow meters coupled to said all but one fill-pipe are monitored for the out-flow of gas or wet vapor as liquid is supplied to said tank and the build-up of pressure is controlled by operation of the shut-off valve.

14. A method of testing as claimed in claim 8, in which the pressure within the common manifold is monitored as liquid is drawn from the tank, as a first step of the testing method and before liquid is supplied to the tanks.

15. A method as claimed in claim 8 and wherein the common manifold is fitted with a pressure/vacuum valve arranged to vent the manifold to atmosphere whenever the pressure differential between that in the common manifold and atmosphere exceeds a predetermined value, in which method the normal operation of the pressure/vacuum valve is checked by operation of the shut-off valve during the performance of the testing method.

16. A method as claimed in claim 8, wherein the testing method is repeatedly performed by transferring a flow meter from one fill-pipe to another and then supplying liquid to said one fill-pipe and monitoring for out-flow of gas or wet vapor from the other fill-pipes.

17. A method as claimed in claim 1, for use in conjunction with a fuel delivery tanker having a vapor recovery system, in which a hose is arranged to connect the other side of said shut-off valve to the fuel delivery tanker's vapor recovery system, and a pressure gauge is arranged to sense pressure in that hose, to test for correct operation of the vapor recovery system.

18. A method as claimed in claim 8, for use in conjunction with a fuel delivery tanker having a vapor recovery system, in which a hose is arranged to connect the other side of said shut-off valve to the fuel delivery tanker's vapor recovery system, and a pressure gauge is arranged to sense pressure in that hose, to test for correct operation of the vapor recovery system.

* * * * *